United States Patent

[11] 3,600,583

[72] Inventor Donald A. Paynter
 Goleta, Calif.
[21] Appl. No. 809,721
[22] Filed Mar. 24, 1969
[45] Patented Aug. 17, 1971
[73] Assignee EG & G, Inc.
 Bedford, Mass.

[54] APPARATUS AND METHODS FOR READING THERMOLUMINESCENT DOSIMETERS AND THE LIKE
 10 Claims, 3 Drawing Figs.

[52] U.S. Cl. .................................................. 250/83.3,
 250/71.5
[51] Int. Cl. .................................................. G01t 1/16
[50] Field of Search ........................................ 250/83.3,
 71.5, 71

[56] References Cited
UNITED STATES PATENTS
3,093,734 6/1963 Just ............................. 250/71.5
3,288,997 11/1966 McCall ........................ 250/83.3 X
3,376,416 4/1968 Rutland et al. ............... 250/71.5

Primary Examiner—James W. Lawrence
Assistant Examiner—Davis L. Willis
Attorneys—Ralph L. Cadwallader and Shapiro and Shapiro ABSTRACT: Thermoluminescent dosimeter reader in which dose measurements are based on the glow curve peak. Measurements are made by comparing the output of a photomultiplier tube with the analog-converted state of a digital counter, the comparison being performed by alternately connecting a capacitor to the output of the digital-to-analog converter and to the signal from the photomultiplier, periodically, in order to produce error pulses which are amplified in an AC amplifier and which advance the counter when the sense of the error indicates that the signal is greater than the counter state. A two-speed clock controls the sampling frequency at which measurements are performed, so that the signal source is isolated from the measurement circuit most of the time, and the counter is advanced rapidly when the signal exceeds the counter state. Range change circuitry inserts a shunting impedance in the input of the comparator when the counter fills to capacity, resets the counter, and actuates an indicator connected to the counter.

INVENTOR
DONALD A. PAYNTER

APPARATUS AND METHODS FOR READING THERMOLUMINESCENT DOSIMETERS AND THE LIKE

BACKGROUND OF THE INVENTION

This invention relates to thermoluminescent dosimetry and more particularly to the reading of the glow curve peak of thermoluminescent dosimeters.

In well known thermoluminescent dosimeters the energy storage properties of thermoluminescent manganese-activated calcium fluoride, or lithium fluoride, for example, are exploited to provide a measure of ionizing radiation, such as ultraviolet or gamma, to which the dosimeter has been exposed. The dosimeter emits light when heated after exposure to ionizing radiation. The plot emitted light versus temperature is called a glow curve, and both the area under the curve and the peak of the curve are proportional to the total radiation dose.

BRIEF DESCRIPTION OF THE INVENTION

The present invention is directed to apparatus and methods for reading thermoluminescent dosimeters quickly and with high precision and accuracy, and economically enough to permit such measurements to be performed wherever the need may exist.

An object of the invention is to provide apparatus and methods of the foregoing type which operate by measuring the glow curve peak, rather than the integration of the total light output, so as to eliminate errors due to the presence of low-temperature traps, as may exist in lithium fluoride dosimeters, for example.

Another object of the invention is to provide apparatus and methods of the foregoing type which produce both digital and analog outputs over a wide dose range.

Briefly stated, a specific embodiment of the present invention employs an electrometer-comparator which periodically compares the digital-to-analog converted state of a digital counter with the signal input from a photomultiplier read head and which produces error pulses for advancing the counter when the signal exceeds the counter state. The signal is sampled periodically, but most of the time it is isolated from the measurement circuits, which present a high impedance to the signal source. When the comparison shows that the signal exceeds the counter state, the sampling rate is greatly increased in order rapidly to bring the counter into balance with the signal. If the signal is of such magnitude that the counter fills to capacity, a range change circuit is actuated, to attenuate the signal, to actuate a range change indicator, and to reset the counter.

BRIEF DESCRIPTION OF THE DRAWINGS

The invention will be further described in conjunction with the accompanying drawings, which illustrate typical apparatus of the invention, and wherein.

DETAILED DESCRIPTION OF THE INVENTION

Figures 1, 3:
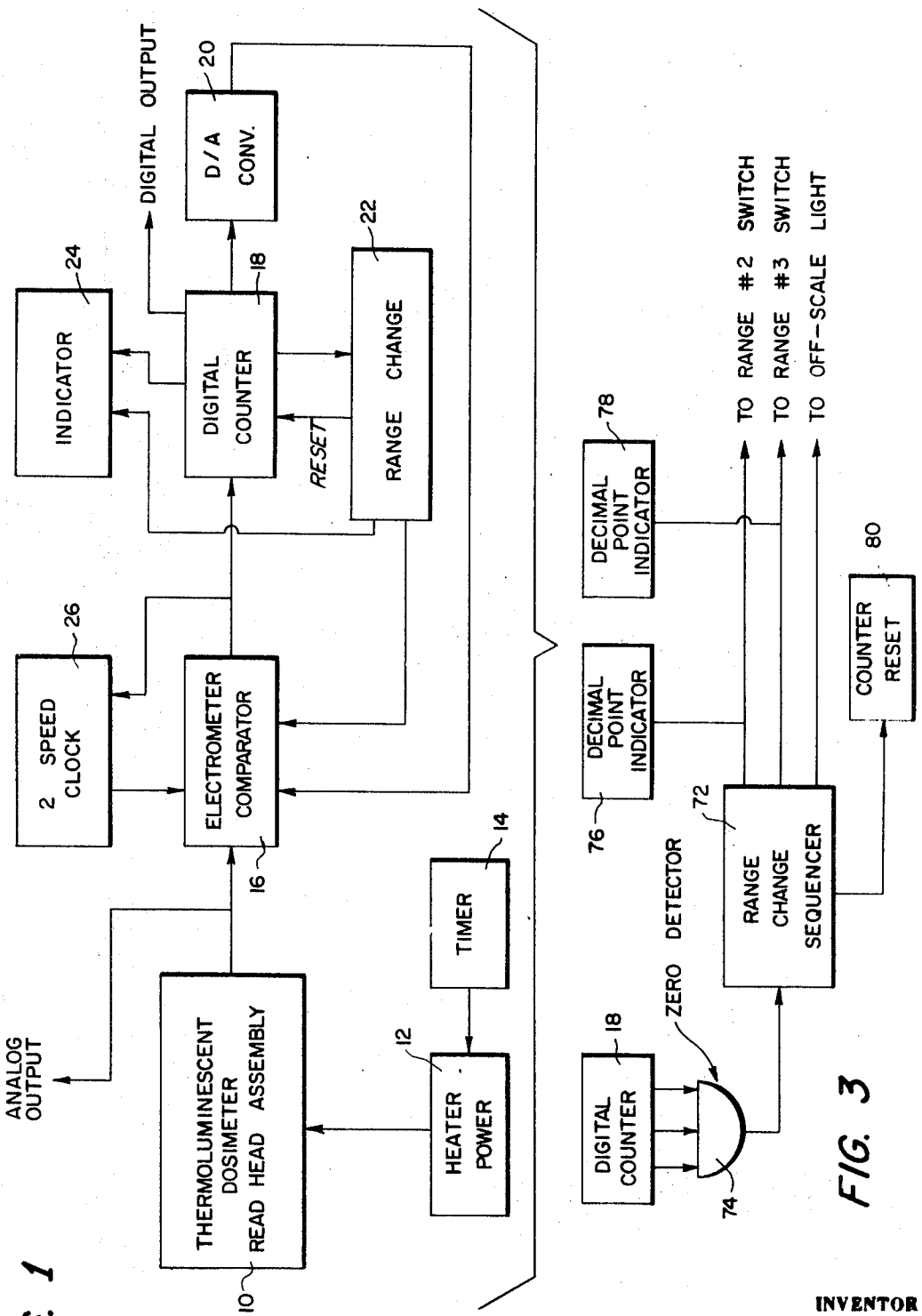
FIG. 1 is a block diagram of a system in accordance with the invention.
FIG. 3 is a block diagram of a range change circuit and associated circuits of the invention.

Referring to the drawings, and initially to FIG. 1 thereof, a system in accordance with the invention comprises a thermoluminescent dosimeter read head assembly 10 supplied with heating current from a heater power source 12 controlled by a timer 14. The dosimeter itself may be of the conventional type alluded to above and may have a configuration as shown and described in U.S. Pat. No. 3,376,416 granted Apr. 2, 1968, for example. It may incorporate an electric heater coil coated with the thermoluminescent material and mounted in an evacuated or gas-filled envelope. When the dosimeter is placed in a matching receptacle of the read head assembly, it is connected to the heater power supply 12, and when a read switch is actuated, the timer energizes the heater power supply 12 for a predetermined length of time to cause the thermoluminescent material to emit light, the peak value of which is dependent upon the previous exposure of the dosimeter to ionizing radiation. The read head assembly may comprise a photomultiplier tube positioned to receive the light emitted by the dosimeter and shielded from ambient light. The photomultiplier tube is provided with the usual high voltage supply. A blue-green filter may be interposed between the dosimeter and the photomultiplier tube to shield the tube from much of the black body radiation from the heated dosimeter.

The signal current from the photomultiplier tube is connected to one input of an electrometer-comparator 16, the output of which is connected to the input of a digital counter 18. The output of the digital counter is connected to a digital-to-analog converter 20, the output of which is connected to a second input of the electrometer-comparator 16. The counter 18 may employ a standard configuration of integrated circuit flip-flops to provide three decades of binary coded decimal units, for example. The digital-to-analog converter 20 may be of a conventional type which converts the digital state of the counter to an analog current or voltage supplied to the comparator 16. The comparator itself will be described more fully hereinafter.

The output of the digital counter 18 is also connected to a range change circuit 22 which controls the insertion of range impedances in the input circuit of the comparator for effectively attenuating the signal current from the dosimeter read head assembly 10 when the current exceeds the maximum value of the counter digital-to-analog output. Whenever a range change is made, the digital counter 18 is reset, and an appropriate element of an indicator 24 is actuated. The indicator displays the digital state of the counter 18.

The electrometer-comparator 16 is controlled by a two-speed clock 26 which causes the periodic sampling of the signal from the read head assembly 10 and the comparison of the signal with the converted output of the digital counter 18. In accordance with the invention, whenever the photomultiplier current exceeds the DC output of the digital-to-analog converter 20, the electrometer-comparator 16 generates an output pulse which advances the counter 18. The output pulse also modifies the action of the two-speed clock 26 so as greatly to increase the sampling rate. The counter continues to advance upon successive output pulses from the comparator until the DC output of the converter 20, which increases as a consequence of the counter advance, matches the photomultiplier current. A balanced condition then exists, and the electrometer output reverts to a null condition. This stops the counter, and the counter state is then indicative of the magnitude of the photomultiplier tube current. The counter is not advanced whenever the photomultiplier signal current is less than the digital-to-analog converter output. Hence, the counter state represents the peak value of the photomultiplier tube output current. If the photomultiplier current is such that the digital counter fills to capacity, the range change circuit 22 is actuated, switching a shunting resistor across the electrometer input, so as to reduce the effective photomultiplier current supplied to the electrometer, and resetting the digital counter. Further reference to the range change circuitry will be made hereinafter.

Figure 2:
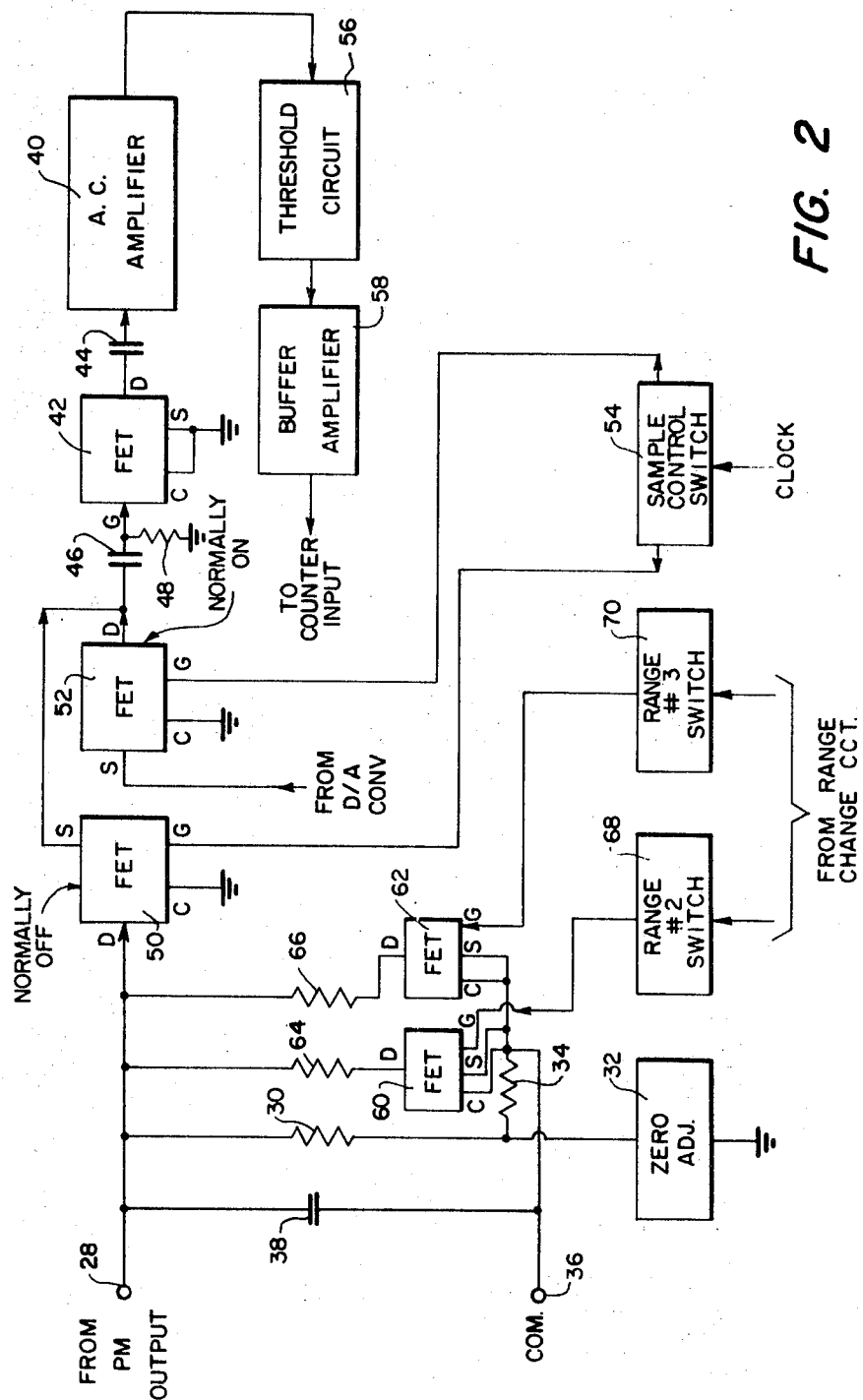
FIG. 2 is a partially schematic block diagram of an electrometer-comparator circuit in accordance with the invention.

Referring now to FIG. 2, an important concept of the invention is the utilization of a switching method at the input of the illustrated electrometer-comparator to compare a low level input current (approximately $10^{19}$ amp.) to a DC derived from the digital-to-analog converter 20. This method produces a pulse error voltage, rather than a DC error voltage, and permits the utilization of AC techniques for amplification and digitization. Hence, problems due to DC error amplifier drift, which have plagued prior thermoluminescent dosimeter readers, are thereby eliminated. Another important characteristic of the switching method is that virtually no current is drawn from the input when a balanced condition is obtained. A very high effective input impedance is therefore possible.

The electrometer-comparator may be thought of from a functional point of view as comprising two sections: (1) the input switching and range change section and (2) the AC amplifier and comparator section. The signal current from the photomultiplier tube is applied to terminal 28 and passes through a known resistance, comprising resistor 30 (e.g., 10 meg.) and the resistance of a zero adjust circuit 32, producing a voltage drop across this resistance proportional to the signal current. The zero adjust circuit 32 may comprise a potentiometer for setting the zero condition of the instrument. Resistor 30 is also connected to a resistor 34 (e.g., 4.7K) and through this resistor to a common terminal 36, which may be connected to an adjustable reference potential for the electrometer. Terminals 28 and 36 are bridged by a capacitor 38 (e.g., .0033 microfarad).

The measurement circuit of the invention comprises an AC amplifier 40 having a high input impedance field effect transistor 42 (gate G, source S, drain D, case C) in its input, which receives a low level pulse error signal, amplifies it, and feeds it to the input of amplifier 40 through a coupling capacitor 44. The amplifier may be a three-stage transistorized AC amplifier with an additional low impedance output stage.

The low level pulse error signal is obtained from a measurement capacitor 46 connected to the gate of transistor 42 in an input circuit which includes resistor 48 (e.g., 3.6 meg.). Capacitor 46 may have a value of 470 pf, for example. Field effect transistors 50 and 52 serve as comparator switches. Switch 52 is almost continuously turned "on" to connect the output from the digital-to-analog converter to capacitor 46. Periodically, switch 52 is turned "off," for approximately 10 to 20 microseconds, and simultaneously switch 50 (which is normally "off") is turned "on" for the same period. Capacitor 46 is now connected to the photomultiplier tube signal at terminal 28. The switching circuitry for controlling switches 50 and 52 is indicated by the sample control switch 54 actuated by clock pulses from the two-speed clock 26 of FIG. 1. Block 54 may include conventional bipolar transistor switches which respond to each clock pulse to turn FET 52 "off" and turn FET 50 "on" for a short interval, which may be determined by the length of the clock pulse.

If the photomultiplier signal current is equal to the DC output of the digital-to-analog converter, no change in voltage takes place at capacitor 46 when the periodic sampling of the signal current from the photomultiplier tube occurs. On the other hand, should a difference exist, a voltage change occurs upon capacitor 46, and this change is fed through FET 42 to the input of AC amplifier 40. Since the switching action occurs during a brief period (10 or 20 microseconds) compared with the "off" time (generally several milliseconds) a short low duty time pulse is produced at the AC amplifier input. The low duty time is highly desirable in that the effect is to maximize the input impedance presented by the electrometer to the photomultiplier tube signal source and to minimize problems due to switching transients. The pulse output from the AC amplifier 40 is applied through a threshold circuit 56 and a buffer amplifier 58 to the input of the digital counter 18. The threshold circuit determines the minimum level of signal which will advance the counter (as established by a DC bias upon a differential amplifier, for example) and the buffer amplifier 58 provides isolation between the electrometer circuit and the counter. If the signal current from the photomultiplier tube is less than the DC output of the digital-to-analog converter, it is desired that the counter not be affected. This may be accomplished by the utilization of the threshold circuit 56 or by employing counter stages which respond only to pulses of a particular polarity.

As pointed out previously, when the electrometer-comparator produces an output pulse of polarity appropriate to advance the counter, the operation of the two-speed clock 26 of FIG. 1 is modified to increase the sampling rate. The clock may comprise a conventional unijunction transistor relaxation oscillator with a flip-flop switch which responds to error pulses of the proper polarity to modify the frequency of the oscillator, as by shunting a timing element. The high speed operation of the clock may be at 20 kc for example. When electrometer balance is achieved, the flip-flop reverts to its initial state, and the clock returns to its slow rate operation, which may be at 50 pps. The two-speed arrangement provides a very desirable sampling condition for the electrometer. When a reading error exists as detected by the electrometer, a high sampling rate is produced, and the error is corrected rapidly. During a balance condition a slow sampling rate exists, and this maximizes impedance at the electrometer input.

Field effect transistors 60 and 62 serve as switches to connect shunt resistances 64 (e.g., 1 meg.) and 66 (e.g., 100 K), respectively, across the input whenever actuated by automatic range changing circuitry, including bipolar transistor range change switches 68 and 70, respectively. The range change circuitry is shown in greater detail in FIG. 3. It may include a range change sequencer 72, which may be any conventional sequencing circuit, such as a ring counter. When the digital counter 18 fills to capacity, and returns to zero (as it is designed to do), this condition is detected by a zero detector 74, such as an AND circuit connected to the outputs of the three stages of the counter, and the range change sequencer 72 is advanced so as to transmit an output pulse to range 02 switch 68 of FIG. 2. At the same time a decimal point indicator 76 is actuated. If the digital counter again fills to capacity, the range change sequencer actuates range 03 switch 70 of FIG. 2. At the same time decimal point indicator 78 is actuated. If the magnitude of the signal input is still too high, in spite of the insertion of the shunt range resistors, the range change sequencer advances to its next position to energize an off scale light. The decimal point indicators 76 and 87 are part of indicator 24 of FIG. 1, which may be comprised of Nixie tubes or other standard gas discharge numeric indicator tubes to display the counter state in direct readout decimal numbers.

The range change sequencer 72 also ensures that the counter 18 remains at zero until the range change is complete. This is achieved by an output from the range change sequencer to the counter reset 80, which holds the counter at zero (and may also disable the clock, if desired) for a sufficient period of time to ensure the insertion of the range change resistor. A delay component, such as a pulse stretcher, may be inserted between the range change sequencer and the counter reset to establish a predetermined reset interval before counting commences again.

An actual instrument constructed in accordance with the foregoing description has a sensitivity of 0.1R, a dose range of from 1R to $10^4$R, and a readout time of 10 seconds. An analog output and an additional digital output may also be provided as shown in FIG. 1. Also, calibration, switching-transient suppression, and manual resetting circuits may be provided. Moreover, since it is desired that the comparator switches 50 and 52 pass current from the signal and the converter output, respectively, without errors due to gate current, the gate current should be closely controlled, and bias circuits which limit the gate current may be employed.

While a preferred embodiment of the invention has been shown and described, it will be apparent to those skilled in the art that changes can be made in this embodiment without departing from the principles and spirit of the invention, the scope of which is defined in the appended claims.

The invention I claim is:

1. Apparatus for reading the peak output of a thermoluminescent dosimeter or the like, comprising means for heating said dosimeter, means for producing an electrical signal proportional to the light output of the dosimeter, a digital counter, a digital-to-analog converter connected to the output of said counter, means for periodically comparing said signal and the output of said converter and producing an output pulse when said signal is greater than the output of said converter for advancing said counter, and means for indicating the state of said counter.

2. Apparatus in accordance with claim 1, wherein said comparing means has two-speed clock means for controlling the periodic comparison, said clock means being responsive to said output pulse of said comparing means for increasing the rate of operation of said clock means, whereby when said comparing means produces said output pulses, the signal and the output of said converter are compared more frequently in order to permit said counter to be advanced more rapidly when the signal is greater than the output of the converter.

3. Apparatus in accordance with claim 1, further comprising range change means for reducing the signal input to said comparing means when said counter has counted to its capacity.

4. Apparatus in accordance with claim 3, wherein said range change means comprises means for resetting said counter when said counter has counted to its capacity.

5. Apparatus in accordance with claim 3, wherein said range change means has associated therewith means for controlling said indicating means to indicate a change of range.

6. Apparatus in accordance with claim 5, wherein said means associated with said range change means comprises decimal point indicator means.

7. Apparatus in accordance with claim 3, wherein said range change means comprises a sequencer for inserting different range impedances into the input of said comparing means when said counter counts to its capacity successively.

8. Apparatus in accordance with claim 1, wherein said comparing means comprises an AC amplifier with a capacitor connected to its input and means for connecting said capacitor alternately to the output of said converter and to said signal in order to produce a change in charge upon said capacitor constituting said pulse when the signal exceeds the converter output.

9. Apparatus in accordance with claim 8, there being a threshold circuit interposed between the output of said AC amplifier and the input of said counter.

10. Apparatus in accordance with claim 1, said counter being responsive to pulses of one polarity but not the opposite polarity.